United States Patent
Schuster et al.

(10) Patent No.: US 12,384,560 B2
(45) Date of Patent: Aug. 12, 2025

(54) COUPLING MODULE HAVING A BUMPER PIVOTABLY ATTACHED TO A FLOOR

(71) Applicant: HÜBNER GmbH & Co. KG, Kassel (DE)

(72) Inventors: Heinz Schuster, Kassel (DE); Sebastian Schmelz, Niestetal (DE); Lukas Grimm, Spangenberg (DE)

(73) Assignee: HÜBNER GmbH & Co. KG, Kassel (DE)

( * ) Notice: Subject to any disclaimer, the term of this patent is extended or adjusted under 35 U.S.C. 154(b) by 605 days.

(21) Appl. No.: 17/816,879

(22) Filed: Aug. 2, 2022

(65) Prior Publication Data
US 2023/0042571 A1   Feb. 9, 2023

(30) Foreign Application Priority Data
Aug. 4, 2021   (EP) .................................... 21189645

(51) Int. Cl.
*B64F 1/305*   (2006.01)
(52) U.S. Cl.
CPC .................................. *B64F 1/3055* (2013.01)
(58) Field of Classification Search
CPC ............................. B64F 1/305; B64F 1/3055
USPC ......................................................... 14/71.5
See application file for complete search history.

(56) References Cited

U.S. PATENT DOCUMENTS

| | | | | |
|---|---|---|---|---|
| 3,665,536 A | * | 5/1972 | Jackson | B64F 1/305 318/676 |
| 3,693,204 A | * | 9/1972 | Eggert, Jr. | B64F 1/305 14/71.5 |
| RE38,804 E | * | 10/2005 | Stephenson | B64F 1/3055 14/71.1 |
| 7,596,826 B2 | * | 10/2009 | Anderberg | B64F 1/305 14/71.5 |
| 7,690,065 B2 | * | 4/2010 | Muller | B64F 1/305 14/71.5 |
| 10,780,994 B2 | * | 9/2020 | Xiang | E01D 19/125 |
| 2002/0100128 A1 | | 8/2002 | Tholen et al. | |
| 2003/0229955 A1 | | 12/2003 | Savage | |

FOREIGN PATENT DOCUMENTS

| | | | | |
|---|---|---|---|---|
| CN | 113636097 A | * | 11/2021 | |
| EP | 2462199 B1 | | 5/2015 | |
| EP | 3301028 B1 | | 9/2019 | |
| ES | 2402880 T3 | * | 5/2013 | B64F 1/305 |
| JP | H0726238 Y2 | * | 6/1995 | |

* cited by examiner

*Primary Examiner* — Gary S Hartmann
(74) *Attorney, Agent, or Firm* — DINSMORE & SHOHL LLP

(57) ABSTRACT

A coupling module as an interface between an air passenger bridge or air passenger stairs and the fuselage of an aircraft has a floor and at least the floor has a floor bumper at an end facing the aircraft fuselage. The floor bumper has a floor bumper segment that is arranged at the coupling module pivotable about a joint having a horizontal axis.

14 Claims, 3 Drawing Sheets

COUPLING MODULE HAVING A BUMPER PIVOTABLY ATTACHED TO A FLOOR

CROSS-REFERENCE TO RELATED APPLICATIONS

This application claims priority to European Patent Application 21189645.1, filed Aug. 4, 2021, which is hereby incorporated by reference in its entirety.

FIELD OF THE INVENTION

The invention relates to a coupling module as an interface between an air passenger bridge or air passenger stairs and the fuselage of an aircraft, comprising a floor, wherein at least the floor has a floor bumper at its front-side end facing the aircraft fuselage. The subject matter of the invention is likewise an air passenger bridge or air passenger stairs having a coupling module as an interface between the air passenger bridge or air passenger stairs and the fuselage of an aircraft.

BACKGROUND OF THE INVENTION

A coupling module as an interface between an air passenger bridge or air passenger stairs and the fuselage of an aircraft is sufficiently known from the prior art. Such coupling modules are, for example, arranged at the air passenger bridge in the region of the front end of the air passenger bridge and form the direct transition between the air passenger bridge, on the one hand, and the aircraft, on the other hand. Such a coupling module as an interface e.g. for an air passenger bridge in detail comprises a folding canopy or a bellows, wherein the folding canopy is formed as approximately U-shaped in a view from the front side and has a bumper at its front-side, open end by which the folding canopy is pivotable by a corresponding pivot device in the direction toward the aircraft fuselage in the region of the entrance to the aircraft. Before the folding canopy is pivoted toward the aircraft fuselage, the coupling module of the air passenger bridge or air passenger stairs is traveled relatively close to the aircraft, in part so far until floor bumper of the floor region of the coupling module contacts the floor bumper attached to the aircraft fuselage at the front side.

Aircraft fuselages are in particular greatly contoured in the front region of the aircraft. It has always been endeavored to ensure a complete contact of the floor of the coupling module at the aircraft, in particular in the front region of the aircraft. It is already known from EP 2 462 199 B1 to this extent to design the floor of a coupling module as segmentable at least in partial pregions. This was based on the idea that, against the background that particularly with a coupling module that should be positioned at the aircraft in the region of the door opening in the front region of an aircraft fuselage, the possibility of a gap-free contact at the aircraft fuselage should at least be made possible in the greatly contoured region of the aircraft fuselage.

However, it is now the case that the newest aircraft fuselages have a skin of plastic. A direct contact of the bumper device of the coupling module was now no longer desired. A minimal distance should rather be maintained, in particular between the floor of the coupling module and the aircraft fuselage. To ensure this, it is known from EP 3 301 028 B1 to segment the front floor region of the coupling module multiple times and thus to follow the contour of the aircraft fuselage by displacing the individual segments in the direction of the aircraft fuselage with the aim of minimizing the distance between the floor of the coupling module, on the one hand, and the aircraft fuselage, on the other hand. The individual floor segments are connected to one another here by a floor bumper so that in the ideal case the floor bumper with the floor segments arranged thereat extends over its whole length at a small distance from the skin of the aircraft.

It is now known that with specific aircraft types such as the Boeing 737 or 787 measuring devices such as sensors and pitot tubes are attached close to the front-side entrance in the region of the floor and may be damaged if the floor bumper touches these measuring devices on contact with the aircraft fuselage.

To avoid damage to the measuring devices, it is known from US 2003/0229955 A1 to design parts of the floor as telescopic and so to protect the measuring devices from damage by retracting a floor segment. It is disadvantageous in this respect that a relatively large opening is produced in the floor of the coupling module that harbors a risk of injury for boarding and deplaning passengers and ultimately also for airport staff.

US 2002/0100128 A1 shows a similar path when it is proposed there to flip up the floor part, including the bumper segment, that can come into contact with the measuring devices. A relatively large opening is also produced here that harbors the risk that persons exiting or boarding the aircraft tread in the opening produced by the flipping up of the floor segment and fall or injure themselves in another way. There is furthermore the risk that when openings are produced, objects fall onto the apron and form a hazard for turbines.

It is also known to shorten the floor bumper in the region of the measuring devices, which, however, also allows an opening toward the fuselage of the aircraft to be formed with the previously described disadvantages resulting therefrom.

SUMMARY OF THE INVENTION

The underlying object of the invention accordingly comprises protecting the measuring devices from damage due to the floor bumper and simultaneously preventing obstacles being produced on the floor here that bring about the risk of persons tripping and very generally a risk of injury. It should also be prevented that objects fall onto the apron through openings that are produced.

This object is achieved starting from a coupling module as disclosed herein and starting from an air passenger bridge or air passenger stairs as disclosed herein. Further measures improving the invention are also disclosed.

The object is achieved in accordance with the invention in that the floor bumper has at least one floor bumper segment that is arranged pivotable by means of a joint about a pivot axis with respect to the floor of the coupling module. The floor bumper segment is here in particular pivotable with respect to the floor independently of said floor. The possibility is hereby opened up of pivoting that part of the floor bumper from the region through which there would otherwise be a risk of damage to the measuring devices such as the sensors and pitot tubes. The pivot axis is here in particular defined by the joint and substantially extends in the main plane of extent of the floor. The pivot axis having the connection line of the floor bumper can specifically converge with the floor of the coupling module.

The joint can e.g. be arranged at the front side at, below, or on the floor of the coupling module. The possibility is hereby opened up of pivoting the pivotable floor bumper segment by the arrangement at the joint into a position on or below the floor in which the floor bumper segment can no longer come into collision with the measuring devices. This means that the floor bumper segment is pivotably arranged at the coupling module that could come into contact with the sensors or measuring devices.

The joint can generally have any desired design. It in particular provides at least one pivot axes for the pivotable arrangement of the floor bumper segment at the floor of the coupling module. The joint can for this purpose have e.g. two joint parts that are connected to one another rotatably about the pivot axis. The joint can specifically be formed in the manner of a hinge. In this respect, the use of a film hinge is also possible.

The hinge can be so smooth that it is raised and pivoted on an abutment of the measuring device. The risk of damage to the measuring device can thereby be largely avoided even if the manually flipping upward of the floor bumper segment is forgotten.

The floor bumper segment can in particular be configured as a half-shell shaped element. It can be flush with the floor bumper in the unfolded state. The floor bumper segment can be formed—in a similar manner to the remaining part of the floor bumper—from an elastically yielding material to avoid damage to the aircraft fuselage. The floor bumper segment can, however, also have other shapes. It can e.g. be formed substantially identical to the remaining floor bumper and have the shape of a cylinder. Cutouts can optionally be present here, e.g. at the rear side to provide the required construction space for the joint.

In a further embodiment, the joint can have a shell-like element for receiving the floor bumper segment. The floor bumper segment is to this extent securely gripped by the joint that is in particular formed as a hinge.

There is no substantial risk of injury to passengers on the use of the floor bumper in accordance with the invention. On the one hand, this is achieved in that no opening or only a small opening toward the fuselage of the aircraft is produced. On the other hand, it is the case that—even if a passenger were to kick against the flipped floor bumper segment—no risk of injury is present, on the one hand due to the elastically yielding material of the floor bumper segment and, on the other hand in that the floor bumper segment lies on the floor of the coupling module in the upwardly pivoted or upwardly flipped state and to this extent any opening that is produced toward the fuselage of the aircraft is screened.

Provision can be made In accordance with a further feature of the invention that the floor of the coupling module has a plurality of floor segments displaceable relative to one another in the front end region. There is generally the possibility due to the segmentation of the floor of the coupling module into individual floor segments of moving the floor into contact with the aircraft skin either free of play or with a small play by an individual traveling of the floor segments, that are connected to one another by the floor bumper at the front side, to the fuselage of the aircraft, and indeed also in dependence on the sensitivity of the aircraft skin. The joint can be arranged here e.g. at the upper side or lower side of the floor segment in order thus to implement the pivotable arrangement of the floor bumper segment at the corresponding floor segment.

The pivotable floor bumper segment can in particular form an end region of the floor bumper. It can, however, also form other regions of the floor bumper. It can e.g. admittedly be arranged at the marginal side, with the end region, however, being formed by a fixed floor bumper segment.

It is generally the case that the floor bumper can have exactly one pivotable floor bumper segment. A plurality of pivotable floor bumper segments can, however, also be provided. In addition to the pivotable floor bumper segment or segments, the floor bumper can have at least one floor bumper segment fixed with respect to the floor. If a plurality of pivotable floor bumper segments are provided, they can be arranged next to one another or spaced apart from one another with fixed floor bumper segments being arranged therebetween.

In accordance with an embodiment, the joint is arranged on the upper side of the floor or in the upper region of the front side of the floor segment such that the pivotable floor bumper segment lies on the floor or on its walkable surface in its upwardly pivoted state. In the upwardly pivoted state, an opening angle between the floor bumper segment and the walkable surface of the floor can amount to <90°. It is, however, conversely possible to arrange the joint on the lower side of the floor or in the lower region of the front side of the floor segment. The statements on the fastening to the upper side apply accordingly to this.

The pivotable floor bumper segment can be pivoted manually. Alternatively or additionally, a pivot drive for the pivotable floor bumper segment can be provided. It has already been pointed out that the joint can e.g. be formed as a hinge. The hinge has a pivot axis that can be a component of the floor bumper segment that can be formed as a shell-like element. The pivot drive can engage at such a pivot axis (but also independently of this specific embodiment of the pivot axis) or at the floor bumper segment, for example in the form of an actuator. On actuation of the pivot drive the floor bumper segment can be pivoted upwardly and/or downwardly by means of the pivot drive. The pivot drive can here be configured such that the floor bumper segment remains in the respective end position. However, a kind of free wheel can in particular be provided in the flipped down position that has the effect then when the pivot drive is not functional, the floor bumper segment is nevertheless flipped upward when it abuts an obstacle, e.g. a measuring device at the aircraft fuselage.

The pivot drive can engage the pivot axis of the joint or the pivotable floor bumper segment from above or from below in a further embodiment.

The pivot drive can specifically comprise a motor unit by which a chain drive or a toothed belt or similar is e.g. driven that ultimately drives the pivot movement of the floor pump segment. Any desired other embodiments are, however, also possible for the pivot drive. It can e.g. comprise a linkage or a crank drive.

The coupling module is further characterized in that the floor of the coupling module can be encompassed by a bellows that is U-shaped in a front view or by a U-shaped folding canopy to protect the passengers from weather influences.

The subject matter of the invention is likewise an air passenger bridge or air passenger stairs having a coupling module in accordance with the invention as an interface between the air passenger bridge or air passenger stairs and the fuselage of an aircraft. The statements on the coupling module in accordance with the invention apply accordingly with respect to advantageous embodiments of the air passenger bridge or air passenger stairs in accordance with the invention.

Advantageous further developments result from the description and the drawings. The advantages named in the description of features and of combinations of a plurality of features are only exemplary and can come into effect alternatively or cumulatively without the advantages of embodiments in accordance with the invention necessarily having to be achieved. The features named in the description are to be understood with respect to their number such that exactly this number or a larger number than said number is present without this requiring an explicit use of the term "at least". If therefore, for example, a floor bumper segment is spoken of, it is to be understood such that exactly one floor bumper segment, two floor bumper segments, or a plurality of floor bumper segments is/are present. These features can be supplemented by other features or can be the only features the respective product consists of.

BRIEF DESCRIPTION OF THE DRAWINGS

Further measures improving the invention will be shown in more detail below together with the description of a preferred embodiment of the invention with reference to the Figures.

DETAILED DESCRIPTION OF THE INVENTION

Figure 1:
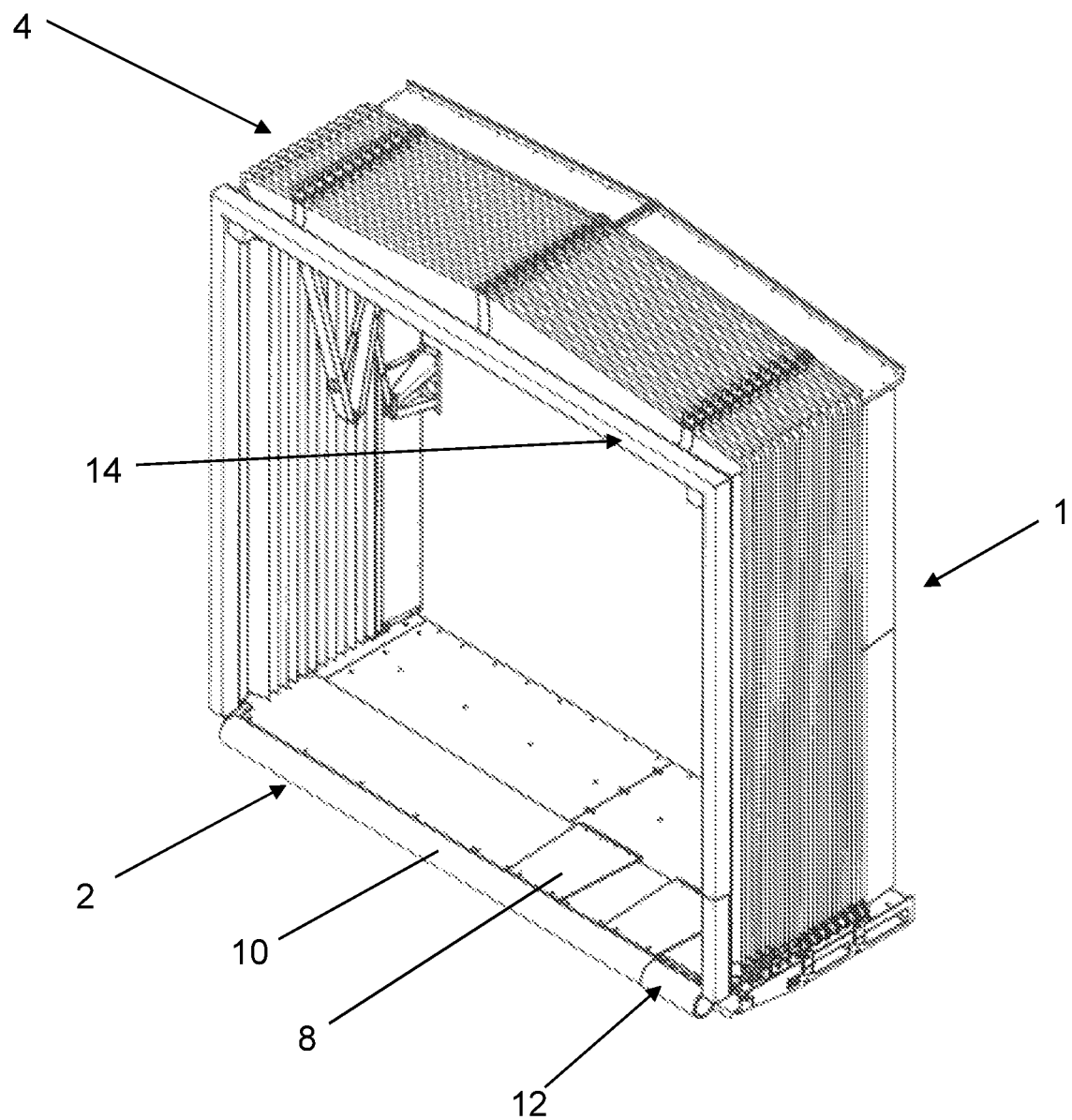
FIG. 1 is a perspective schematic representation of a coupling module with a pivotably arranged floor bumper segment.

FIG. 1 shows an embodiment of a coupling module 1 in accordance with the invention that has a floor 2 that is encompassed by a bellows or by a folding canopy 4 in a U shape. The folding canopy 4 has a U-shaped bumper 14 that extends in accordance with the contour of the folding canopy 4 at its front side, that is at the front side facing the aircraft fuselage, to avoid damage on contact of the folding canopy 4 of the coupling module 1 with the fuselage of the aircraft.

Figure 2:
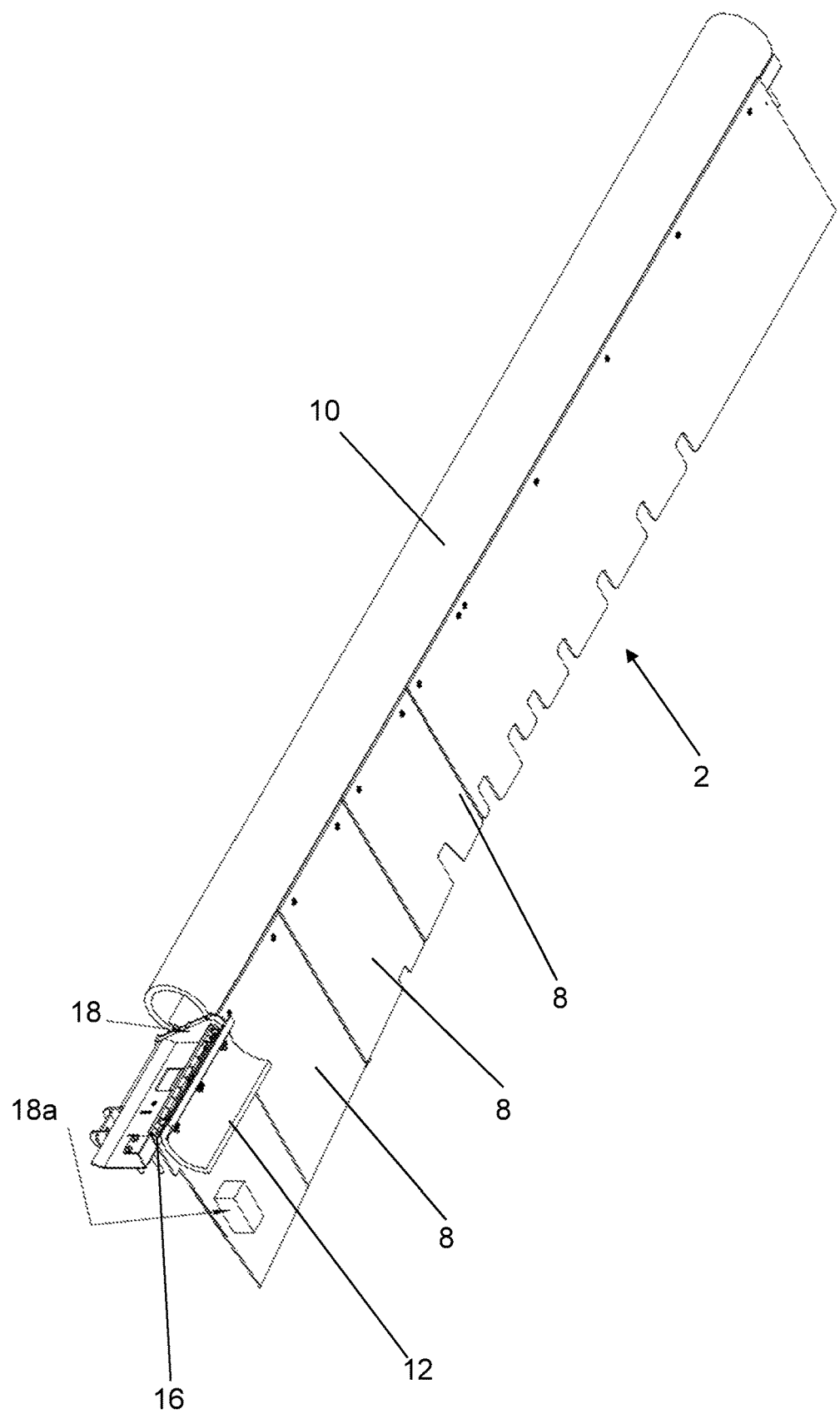
FIG. 2 is a perspective representation of the floor of the coupling module with a floor bumper segment flipped up in an enlarged view.
Figure 3:
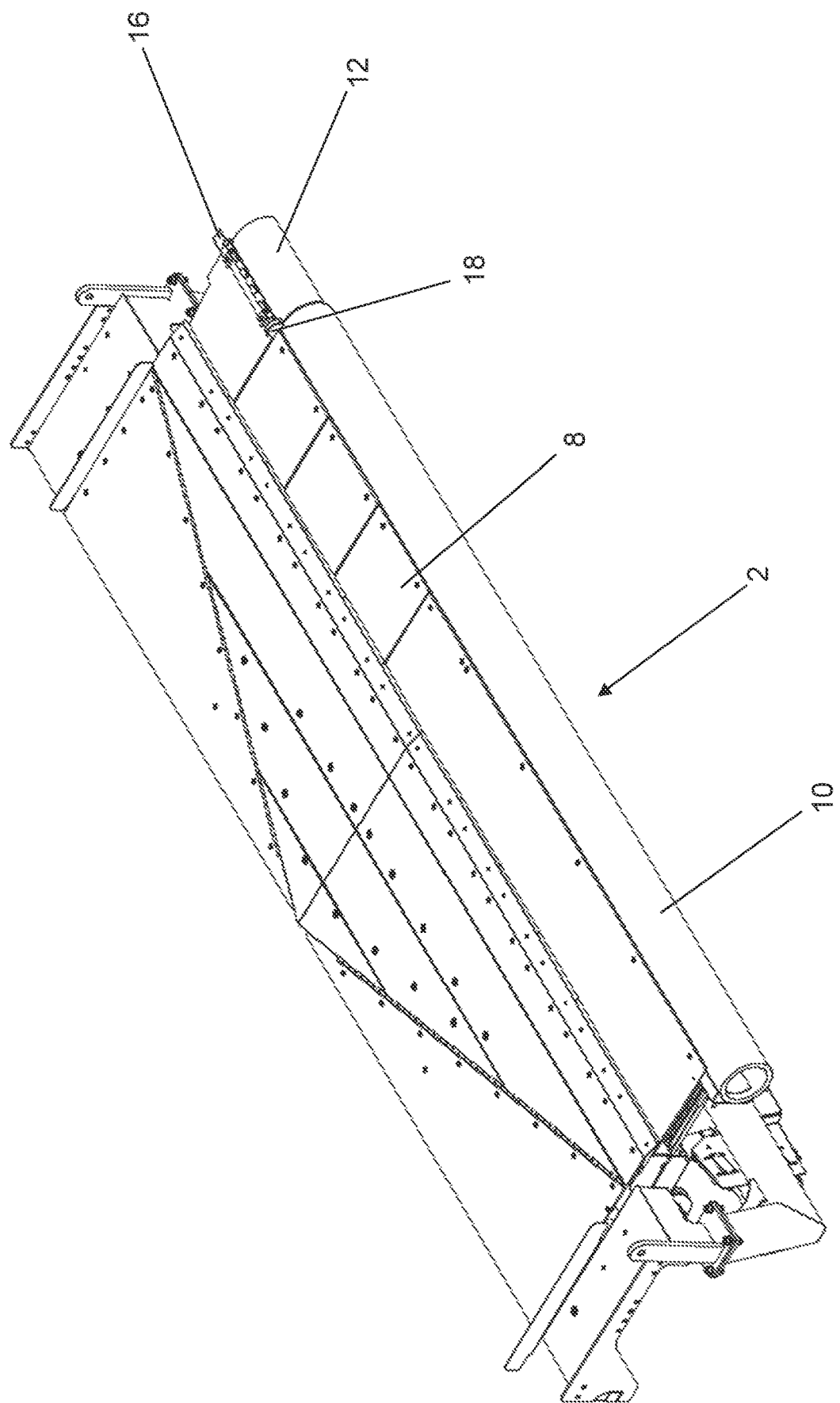
FIG. 3 is a view of the flipped down state of the floor bumper segment in accordance with FIG. 2.

The floor 2 has a plurality of floor segments 8 that are displaceable relative to one another in the direction of the front end side of the coupling module 1 in the embodiment shown in FIGS. 1 to 3 to be able to have the floor track the contour of the aircraft fuselage as also with the folding canopy. The floor segments 8 are connected to the front end side by a floor bumper 10 to avoid damage to the fuselage of the aircraft by the front side of the floor 2. Both the bumper 14 of the folding canopy 4 and the floor bumper 10 as well as the floor bumper segment 12 can be formed e.g. from elastically yielding material.

It has already been pointed out that measuring devices that have to be protected from damage are arranged in the region of the door opening of the aircraft with specific aircraft types. These measuring devices are typically located in the region of the floor 2 of the coupling module 1 so that the measuring devices could be damaged by the floor 2 when the coupling module 1 Is placed on the fuselage. To avoid damage to the measuring devices, the floor 2 has a floor bumper segment 12 in the region in which it can come into contact with the measuring devices, said floor bumper segment 12 being arranged at the floor segment 8 pivotably relative to the remaining floor bumper 10 about a pivot axis by a joint in the installed state. In the embodiment shown in the Figures, the joint is formed in the manner of a hinge 18. The pivot axis here extends in the main plane of extent of the floor segment 8 and is oriented in parallel with its front side. In this respect, the pivot axis extends practically directly along the connection line of the base bumper 10 with the floor 2.

The hinge 16 is arranged on the upper side of the floor segment 8 in the embodiment shown so that the floor bumper segment 12 can be pivoted or flipped up out of the region of the measuring devices (FIG. 2). In accordance with an embodiment that is not shown, the joint can, however, also be arranged on the lower side of the floor segment 8, with the floor bumper segment 12 being able to be downwardly pivoted.

The hinge 16 is configured and applied to the floor segment 8 in the embodiment shown such that the floor bumper segment 12 lies on the walkable surface of the corresponding floor segment 8 in the upwardly pivoted or upwardly flipped position and remains in this position until it is, for example, manually pivoted back into its starting position in which the floor bumper segment 12 is flush with the remaining floor bumper 10 (FIG. 3).

The floor bumper segment 21 is formed as a shell-like elongate element 17 composed of an elastically yielding plastic corresponding to the floor bumper and is e.g. screwed to the hinge 16.

Alternatively or additionally to the manual pivoting upward or flipping up of the floor bumper segment 12, an actuator 18 can be provided as a pivot drive that electrically or hydraulically effects the pivoting of the floor bumper segment 12, e.g. by a switch 18a (FIG. 2, FIG. 3).

The actuator 18 engages the pivot axis of the hinge 16 or the floor bumper segment 17 from below to pivot the pivot axis or the floor bumper segment 12. The pivot drive 18 can generally also engage the axis of the hinge 17 or the floor bumper segment 12 from above. The choice depends on the construction space present, for example.

It can in summary accordingly be stated that a free space can be created by the flipping up of the floor bumper segment 12 in the embodiment shown in the Figures so that there is no risk of damage to the measuring devices.

There is equally also no risk of injury to passengers, for example due to larger openings in the floor of the coupling module, through which e.g. objects could also fall onto the apron.

REFERENCE NUMERAL LIST 1 coupling module
2 floor
4 folding canopy
8 floor segment
10 floor bumper
12 floor bumper segment
14 bumper
16 hinge
17 shell-like element
18 actuator
18a switch

The invention claimed is:

1. A coupling module as an interface between an air passenger bridge or air passenger stairs and the fuselage of an aircraft, comprising:
   a floor having an end configured to face an aircraft fuselage; and
   a floor bumper at the end of the floor, the floor bumper having a floor bumper segment that is arranged pivotably by a joint about a pivot axis with respect to the floor.

2. The coupling module in accordance with claim 1, wherein the joint is arranged at the floor of the coupling module.

3. The coupling module in accordance with claim 1, wherein:
the floor of the coupling module has a plurality of floor segments that are displaceable relative to one another at a front end region;
at least one of the floor segments receiving the floor bumper segment pivotably about the pivot axis by the joint.

4. The coupling module in accordance with claim 3, wherein the joint is arranged at an upper side or lower side of the at least one of the floor segments.

5. The coupling module in accordance with claim 1, wherein the joint is configured as a hinge.

6. The coupling module in accordance with claim 1, wherein the pivotably arranged floor bumper segment forms an end region of the floor bumper.

7. The coupling module in accordance with claim 1, wherein the floor bumper has at least one floor bumper segment fixed with respect to the floor in addition to the pivotably arranged floor bumper segment.

8. The coupling module in accordance with claim 1, wherein the floor bumper segment is formed as a shell-like element.

9. The coupling module in accordance with claim 1, wherein the floor bumper segment is formed as a half-shell-like element.

10. The coupling module in accordance with claim 1, wherein the floor bumper segment is formed from an elastically yielding material.

11. The coupling module in accordance with claim 1, wherein the floor bumper segment has a pivot drive.

12. The coupling module in accordance with claim 11, wherein the pivot drive engages the floor bumper segment from below or from above to initiate a pivot movement.

13. The coupling module in accordance with claim 1, wherein the floor of the coupling module is encompassed by a folding canopy that is U-shaped in a front view.

14. An air passenger bridge or air passenger stairs having a coupling module as an interface between the air passenger bridge or air passenger stairs and the fuselage of an aircraft, the coupling module comprises the coupling module of claim 1.

* * * * *